3,275,651
NITROGEN-CONTAINING DIARYL COMPOUNDS
Alan F. Ellis and Johann G. D. Schulz, Pittsburgh, Pa.,
  assignors to Gulf Research & Development Company,
  Pittsburgh, Pa., a corporation of Delaware
No Drawing. Filed Dec. 16, 1963, Ser. No. 330,563
            22 Claims. (Cl. 260—326)

This invention relates to new diaryl compounds selected from the group consisting of diimides of the structural formula:

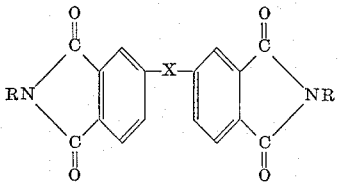

diamic acids of the structural formula:

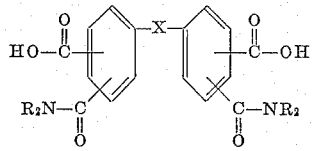

wherein the substituents on the rings are in the 3 and 4 position relative to X; and tetraamides of the structural formula:

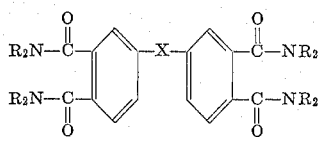

wherein in each of said structural formulae R is selected from the group consisting of hydrogen, alkyl groups having from one to 20 carbon atoms, preferably from one to 10 carbon atoms, such as methyl, isopropyl, butyl, cyclohexyl, octyl, lauryl, stearyl, eicosyl, etc., and aryl groups having from six to 14 carbon atoms, preferably six to 10 carbon atoms, such as phenyl, naphthyl, anthranyl, phenanthranyl, etc., and X is selected from the group consisting of

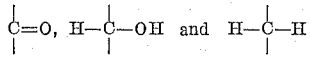

In preparing the new compounds defined above the appropriate diaryl compound is reacted with ammonia or the appropriate amine of the formula $RNH_2$ or $R_2NH$ wherein R can be hydrogen, an alkyl group or an aryl group as defined above. Since the diaryl compound is in each case a solid and ammonia or the amine reacted therewith can be either gaseous, liquid or solid, the reactants are brought together by dissolving the same in an appropriate solvent that will not adversely affect the course of the reaction and desirably will not dissolve the reaction product. Solvents that can be so employed include lower alcohols, such as methanol, ethanol, isopropanol, amyl alcohol, dioxane, acetone, etc. Temperatures and pressures are selected so as to maintain the reactants in intimate relationship throughout the reaction period. The reaction product is recovered from the reaction mixture in any suitable manner, for example by filtration if the reaction product is not soluble in the reaction mixture or by heating to drive off the undesired compounds in the reaction mixture. The new imides are obtained by heating the corresponding new diamic acids to remove water therefrom.

More specifically, the new diimides of this invention can be obtained as follows. 3,4,3',4'-tetracarboxybenzophenone can be reacted with approximately stoichiometric amounts of ammonia or amine as defined above at a temperature of about 0° to about 150° C. and autogenous pressure for about five to 60 minutes to obtain the corresponding tetraammonium salt. The latter is then heated at a temperature of about 100° to about 300° C. and a pressure of about one to about 300 millimeters of mercury for about 60 to about 240 minutes, driving off two mols of ammonia or amine and four mols of water, resulting in the production of the desired diimide.

Alternatively, the diimide can be produced as follows. Another attractive feature of this route resides in the fact that as an intermediate product the new diamic acids of this invention can be obtained. Thus benzophenone 3,4,3',4'-tetracarboxylic dianhydride can be reacted with approximately stoichiometric amounts of ammonia or amine as defined above at a temperature of about 0° to about 100° C. and autogeneous pressure for about five to 60 minutes to obtain the new diamic acids of this invention. To obtain the new diimides of this invention the diamic acids are heated at a temperature of about 100° to about 200° C. and a pressure of about one to about 300 millimeters of mercury for about 30 to about 240 minutes. In so doing two mols of water or alcohol are driven off the defined diamic acids.

To obtain the new tetraamides of this invention the new diimides defined and claimed herein are reacted with approximately stoichiometric amounts of ammonia or amine as defined above at a temperature of about −33° to about 50° C. and a pressure of about one to about 200 pounds per square inch gauge for about 30 to about 240 minutes.

The invention can further be illustrated by the following examples.

*Example I*

A solution of 30.0 grams (0.08 mol) of 3,4,3',4'-tetracarboxybenzophenone in 100 milliliters of methanol was treated with an excess of gaseous ammonia at a temperature of 40° C. and atmospheric pressure for 14 minutes to precipitate the tetraammonium salt of benzophenone 3,4,3',4'-tetracarboxylic acid salt. 33.8 grams of this salt was heated in a vacuum oven at a pressure of 150 millimeters of mercury at 140° C. for two hours to give 25.2 grams (95 percent yield) of benzophenone 3,4,3',4'-diimide. The structure was proven by infrared analysis and the compound was found to sublime at 360° C.

*Example II*

A suspension of 10 grams (0.03 mol) of benzophenone 3,4,3',4'-tetracarboxylic dianhydride in 30 milliliters of dry dioxane was treated with excess gaseous ammonia at a temperature of 25° C. and atmospheric pressure resulting in the immediate precipitation of a white solid. This solid was dissolved in 30 grams of water and the mixture was cooled to 0° C. and maintained at such temperature to precipitate the isomeric mixture of benzophenone 3,4,3',4'-diamic acids. This mixture was heated in a vacuum oven at a pressure of 100 millimeters of mercury at 150° C. for four hours to give 9.0 grams (90 percent yield) of benzophenone 3,4,3',4'-diimide. The structure was proven by infrared analysis.

*Example III*

A slurry of 10 grams (0.03 mol) of benzophenone 3,4,3'4'-diimide and 45 milliliters of liquid ammonia was sealed in a 300 milliliter autoclave at a temperature of −70° C. The autoclave was allowed to come to room temperature and a pressure of 150 pounds per square inch gauge and stirred under these conditions for 18 hours. The reactor was then blown down and the contents recrystallized from dimethyl sulfoxide to give 8.0 grams (78 percent yield) of benzophenone 3,4,3'4'-tetraamide.

The structure was proven by infrared analysis and the compound was found to have a melting point of 168° to 169° C.

Example IV

To a slurry of 32.2 grams (0.1 mol) of benzophenone 3,4,3'4'-tetracarboxylic dianhydride in 100 milliliters of dry dioxane there was added 18.6 grams (0.2 mol) of aniline in one portion. This addition caused dissolution of the dianhydride and warming of the solution. After standing for 30 minutes at atmospheric pressure and a temperature of 40° C. the solution was carefully diluted with 200 milliliters of a saturated aqueous sodium bicarbonate solution. The bulk of the dioxane was extracted with five 50 milliliter ether washes and the aqueous phase was then acidified with 20 grams of concentrated hydrochloric acid, resulting in the immediate precipitation of an off-white solid. This solid was dried at a temperature of 70° C. and a pressure of 100 millimeters of mercury for 60 minutes to give 49.1 grams (97 percent yield) of an isomeric mixture of N,N'-diphenyl-benzophenone 3,4,3'4'-diamic acids. These acids were heated at reflux for 240 minutes in 100 grams of acetic anhydride to give 45 grams (95 percent yield) of N,N'-diphenyl-benzophenone 3,4,3'4'-diimide. The structure was proven by infrared analysis and the compound was found to have a melting point of 300° to 302° C.

Example V

To a slurry of 20 grams (0.06 mol) of benzophenone 3,4,3'4'-tetracarboxylic dianhydride in 100 milliliters of dry dioxane there was added 15 grams (0.21 mol) of n-butylamine in one portion. This addition caused dissolution of the dianhydride and warming of the solution. After standing for 30 minutes at atmospheric pressure and a temperature of 40° C. the solution was carefully diluted with 200 milliliters of a saturated aqueous sodium bicarbonate solution. The bulk of the dioxane was extracted with three 50 milliliter ether washes and the aqueous phase was then acidified with 12 grams of concentrated hydrochloric acid, resulting in the immediate precipitation of a white gum. Warming in 100 grams of 50 percent aqueous ethanol at a temperature of 50° C. for 10 minutes converted this gum to a white solid, which was then dried at a temperature of 70° C. and a pressure of 100 millimeters of mercury for 60 minutes to give 26.8 grams (92 percent yield) of an isomeric mixture of N,N'-di-n-butyl-benzophenone 3,4,3'4'-diamic acids. These acids were heated at reflux in 60 grams of acetic anhydride for one hour to produce 19 grams (77 percent yield) of N,N'-di-n-butyl-benzophenone 3,4,3'4'-diimide. The structure was proven by infrared analysis and the compound was found to have a melting point of 146.5° to 147° C.

In Examples VI, VII, VIII and IX below, benzhydrol 3,4,3'4'-tetracarboxylic dianhydride and diphenylmethane 3,4,3'4'-tetracarboxylic acid were employed. The former was obtained in the manner set forth in U.S. patent application Serial No. 288,603, filed June 18, 1964, by catalytic reduction of 3,4,3'4'-tetracarbomethoxybenzophenone to the corresponding benzhydrol ester, followed by hydrolysis to and dehydration of the corresponding tetraacid, while the latter was obtained in the manner set forth in U.S. patent application Serial No. 288,622, filed June 18, 1963, by catalytic reduction of 3,4,3'4'-tetracarbomethoxybenzophenone to the corresponding diphenylmethane ester, followed by hydrolysis to the desired tetraacid.

Example VI

A solution of 2.0 grams of benzhydrol 3,4,3'4'-tetracarboxylic dianhydride in 25 milliliters of methanol was treated with excess of gaseous ammonia at a temperature of 25° C. and atmospheric pressure. The resulting solution was evaporated to give the isomeric mixture of benzhydrol 3,4,3'4'-diamic acids. These acids were heated in a vacuum oven at a pressure of 100 millimeters of mercury at 140° C. for two hours to give 1.7 grams (85 percent yield) of benzhydrol 3,4,3'4'-diimide. The structure was proven by infrared analysis and the compound was found to have a melting point of 170° to 175° C.

Example VII

A solution of 2.0 grams of diphenylmethane 3,4,3'4'-tetracarboxylic acid in 25 milliliters of methanol was treated with excess of gaseous ammonia at a temperature of 25° C. and atmospheric pressure, resulting in the immediate precipitation of 2.3 grams of the tetraammonium salt of diphenylmethane 3,4,3'4'-tetracarboxylic acid. This salt was heated in aa vacuum oven at a pressure of 100 millimeters of mercury at 140° C. for three hours to give 1.8 grams (95 percent yield) of diphenylmethane 3,4,3'4'-diimide. The structure was proven by infrared analysis and the compound was found to have a melting point of around 375° C.

Example VIII

A one-gram portion of the benzhydrol 3,4,3'4'-diimide produced in Example VI was dissolved in 10 milliliters of liquid ammonia and then sealed in a bomb. The contents of the bomb were held at a temperature of 25° C. and autogenous pressure for 16 hours. The bomb was then blown down and the contents air dried at a temperature of 50° C. and atmospheric pressure for 60 minutes to give 1.1 grams (98 percent yield) of benzhydrol 3,4,3'4'-tetraamide. The structure was proven by infrared analysis and the compound was found to have a melting point of 163° to 165° C.

Example IX

A one-gram portion of the diphenylmethane 3,4,3'4'-diimide produced in Example VII was dissolved in 10 milliliters of liquid ammonia and then sealed in a bomb. The contents of the bomb were held at a temperature of 25° C. and autogenous pressure for 16 hours. The bomb was then blown down and the contents air dried at a temperature of 50° C. and atmospheric pressure for 60 minutes to give 1.1 grams (98 percent yield) of diphenylmethane 3,4,3'4'-tetraamide. The structure was proven by infrared analysis, but the compound had no detectable melting point.

Since the new diamic acids and tetraamides disclosed and claimed herein are easily converted to the corresponding diimides by heating the same at a temperature above about 100° C. at atmospheric or reduced pressure, these two classes of compounds can be considered as intermediates in the preparation of said diimides. The benzophenone 3,4,3'4'-diimides and diamic acids can be employed as grease thickeners for mineral oil and silicone base greases. The greases containing the substituted diimides are more thermally stable than those containing corresponding diamic acids.

Example X

A grease was prepared by milling twice a mixture containing 30 weight percent of N,N'-di-n-butylbenzophenone 3,4,3',4'-diamic acid and 70 weight percent of Gulf Security 61 oil (GR 59896) at 0.002 inch on a Premier mill. The finished grease had a light yellow color with a consistency of soft butter. It had ASTM D1403 penetration values of 383 unworked and 416 worked sixty strokes and an ASTM 566 drop point of 280° F.

Example XI

A grease was prepared by milling twice a mixture containing 35 weight percent of N,N'-diphenylbenzophenone 3,4,3',4'-diimide and 65 weight percent of Gulf Security 61 oil (GR 59896) at 0.002 inch on a Premier mill. The finished grease had a yellow color with a consistency of soft butter. It had ASTM D1403 penetration values of 339 unworked and 373 worked sixty strokes and an ASTM 566 drop point of 523° F.

We claim:
1. Diimides of the structural formula,

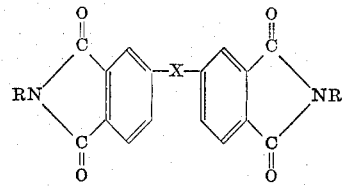

wherein R is selected from the group consisting of hydrogen, alkyl groups and aryl groups and X is selected from the groups consisting of

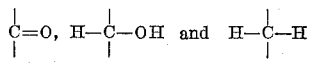

2. Diamic acids of the structural formula,

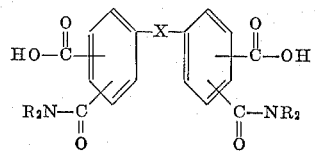

wherein the substituents on the ring are in the 3 and 4 position relative to X, R is selected from the group consisting of hydrogen, alkyl groups and aryl groups and X is selected from the group consisting of

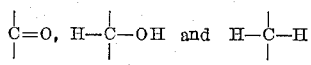

3. Tetraamides of the structural formula,

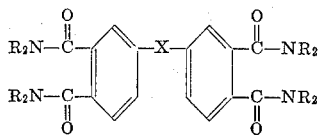

wherein R is selected from the group consisting of hydrogen, alkyl groups and aryl groups and X is selected from the group consisting of

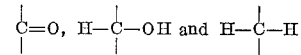

4. Diimides of the structural formula,

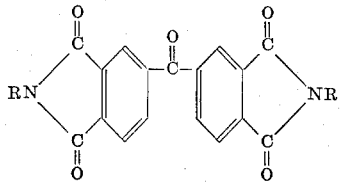

wherein R is selected from the group consisting of hydrogen, alkyl groups and aryl groups.
5. Diamic acids of the structural formula,

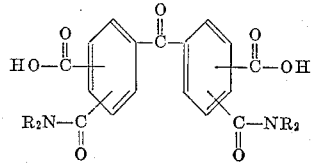

wherein the substituents in the ring are on the 3 and 4 position relative to

and R is selected from the group consisting of hydrogen, alkyl groups and aryl groups.

6. Tetraamides of the structural formula,

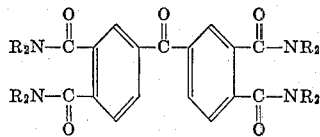

wherein R is selected from the group consisting of hydrogen, alkyl groups and aryl groups.
7. Diimides of the structural formula,

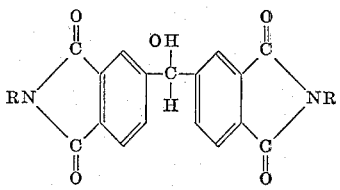

wherein R is selected from the group consisting of hydrogen, alkyl groups and aryl groups.
8. Diamic acids of the structural formula,

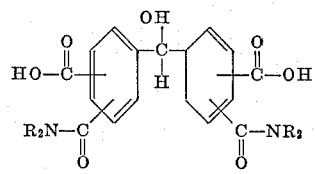

wherein the substituents in the ring are on the 3 and 4 position relative to

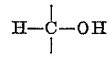

and R is selected from the group consisting of hydrogen, alkyl groups and aryl groups.
9. Tetraamides of the structural formula,

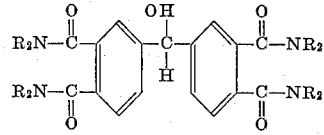

wherein R is selected from the group consisting of hydrogen, alkyl groups and aryl groups.
10. Diimides of the structural formula,

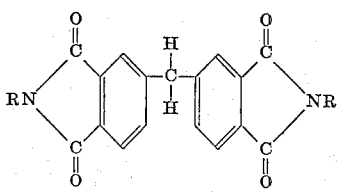

wherein R is selected from the group consisting of hydrogen, alkyl groups and aryl groups.
11. Diamic acids of the structural formula,

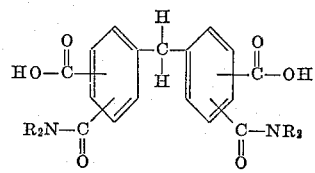

wherein the substituents in the ring are on the 3 and 4 position relative to

and R is selected from the group consisting of hydrogen, alkyl groups and aryl groups.

12. Tetraamides of the structural formula,

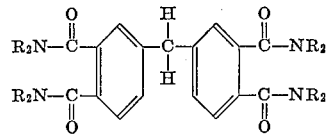

wherein R is selected from the group consisting of hydrogen, alkyl groups and aryl groups.

13. Benzophenone 3,4,3',4'-diimide.
14. Benzophenone 3,4,3',4'-tetraamide.
15. N,N' - di - n - butyl-benzophenone 3,4,3',4'-diamic acid.
16. N,N'-di-n-butyl-benzophenone 3,4,3',4'-diimide.
17. N,N'-diphenyl-benzophenone 3,4,3',4'-diamic acid.
18. N,N'-diphenyl-benzophenone 3,4,3',4'-diimide.
19. Benzhydrol 3,4,3',4'-diimide.
20. Benzhydrol 3,4,3',4'-tetraamide.
21. Diphenylmethane 3,4,3',4'-diimide.
22. Diphenylmethane 3,4,3',4'-tetraamide.

References Cited by the Examiner
UNITED STATES PATENTS

| | | | |
|---|---|---|---|
| 2,647,926 | 8/1953 | Speeter | 260—558 |
| 2,806,059 | 9/1957 | Bruson et al. | 260—517 |
| 2,886,594 | 5/1959 | Surrey | 260—558 |
| 3,060,191 | 10/1962 | Kolb et al. | 260—326 |
| 3,075,007 | 1/1963 | McCracken et al. | 260—517 |
| 3,093,656 | 6/1963 | Dreher et al. | 260—326 |

LORRAINE A. WEINBERGER, *Primary Examiner.*

N. S. RIZZO, *Examiner.*

M. O'BRIEN, T. L. GALLOWAY, *Assistant Examiners.*